United States Patent
Nowottnick

(10) Patent No.: US 11,018,879 B2
(45) Date of Patent: May 25, 2021

(54) METHOD AND SYSTEM FOR AUTHENTICATION WITH SIDE-CHANNEL ATTACK PROTECTION USING PRE-CALCULATED CIPHERS

(71) Applicant: NXP B.V., Eindhoven (NL)

(72) Inventor: Juergen Nowottnick, Hamburg (DE)

(73) Assignee: NXP B.V., Eindhoven (NL)

( * ) Notice: Subject to any disclaimer, the term of this patent is extended or adjusted under 35 U.S.C. 154(b) by 407 days.

(21) Appl. No.: 15/720,025

(22) Filed: Sep. 29, 2017

(65) Prior Publication Data
US 2019/0104408 A1  Apr. 4, 2019

(51) Int. Cl.
| | | |
|---|---|---|
| G06F 11/00 | (2006.01) | |
| G06F 12/14 | (2006.01) | |
| G06F 12/16 | (2006.01) | |
| G08B 23/00 | (2006.01) | |
| H04L 9/32 | (2006.01) | |
| H04W 12/126 | (2021.01) | |
| H04W 12/06 | (2021.01) | |

(52) U.S. Cl.
CPC .......... H04L 9/3271 (2013.01); H04L 9/3247 (2013.01); H04W 12/126 (2021.01); H04L 2209/80 (2013.01); H04L 2209/84 (2013.01); H04W 12/06 (2013.01)

(58) Field of Classification Search
USPC ........................................................ 713/176
See application file for complete search history.

(56) References Cited

U.S. PATENT DOCUMENTS

| | | | |
|---|---|---|---|
| 7,065,340 B1* | 6/2006 | Einola | H04L 63/0428 455/410 |
| 2008/0270793 A1* | 10/2008 | Nowottnick | H04L 9/0662 713/168 |
| 2009/0019284 A1* | 1/2009 | Cho | H04L 9/0844 713/170 |
| 2014/0133656 A1* | 5/2014 | Wurster | H04W 12/08 380/270 |
| 2017/0244697 A1 | 8/2017 | Caceres et al. | |

FOREIGN PATENT DOCUMENTS

WO    2006/120617 A1    11/2006

OTHER PUBLICATIONS

Extended European Search Report for European patent appln. No. 18187495.9 (dated Feb. 13, 2019).

* cited by examiner

*Primary Examiner* — Jeffrey C Pwu
*Assistant Examiner* — Samuel Ambaye

(57) ABSTRACT

Embodiments of an authentication system and a method for authentication using ciphers are described. In the system and method, cryptographic calculations of an encryption algorithm are executed at a base station, in a determined secure environment, to produce a pre-calculated cipher for a subsequent authentication process. The pre-calculated cipher is then used to transmit an authentication request message from the base station and validation of an authentication response message for the subsequent authentication.

20 Claims, 6 Drawing Sheets

METHOD AND SYSTEM FOR AUTHENTICATION WITH SIDE-CHANNEL ATTACK PROTECTION USING PRE-CALCULATED CIPHERS

Embodiments of the invention relate generally to authentication systems and methods, and, more particularly, to systems and methods for authentication with side-channel attack protection.

Systems that make use of cryptographic protocols, such as keyless entry/ignition systems, are vulnerable to implementation attacks especially where an attacker has physical access to a targeted object, e.g., a stolen automobile with a keyless entry/ignition system. With physical access to the targeted object, the attacker can monitor or modify the object in order to recover sensitive information, such a hidden secret key used for encryption. For instance, physical access to the targeted object allows the attacker to detect data that can be used to significantly reduce the strength of the encryption algorithm. This use of detected data is sometimes referred to as a side-channel attack. A particular type of side-channel attack is differential power analysis/attacks (DPA). With a successful side-channel attack to the cryptographic processing module of the base station in a stolen automobile, a replacement transponder may be created using the valid secret key for the stolen automobile.

SUMMARY

Embodiments of an authentication system and a method for authentication using ciphers are described. In the system and method, cryptographic calculations of an encryption algorithm are executed at a base station, in a determined secure environment, to produce a pre-calculated cipher for a subsequent authentication process. The pre-calculated cipher is then used to transmit an authentication request message from the base station and validation of an authentication response message for the subsequent authentication.

In an embodiment, a method for authentication using ciphers comprises, in a determined secure environment, executing cryptographic calculations of an encryption algorithm at a base station to produce a pre-calculated cipher for a subsequent authentication process, storing the pre-calculated cipher in a nonvolatile storage device at the base station, in response to a trigger event, transmitting an authentication request message of an authentication process from the base station, the authentication request message including an interrogation signature cipher based on the pre-calculated cipher, receiving an authentication response message from a responding device at the base station, the authentication response message including a response signature cipher, validating the authentication response message at the base station to determine if the authentication process has been successful, and after the authentication response message has been successfully validated, executing additional cryptographic calculations at the base station to produce a next pre-calculated cipher for a next authentication process.

In an embodiment, the method further comprises transmitting an initial authentication request message of an initial authentication process from the base station, the initial authentication request message including an initial interrogation signature cipher, receiving an initial authentication response message from the responding device or another responding device at the base station, and validating the initial authentication response message at the base station to determine if the initial authentication process has been successful, which indicates that the base station is in a secure environment.

In an embodiment, the encryption algorithm is an algorithm based on Data Encryption Standard (DES), triple DES, Advanced Encryption Standard (AES), Rivest, Shamir, and Adleman (RSA), or elliptic curve cryptography (ECC).

In an embodiment, the nonvolatile storage device is an Electrically Erasable Programmable Read-Only Memory (EEPROM).

In an embodiment, the interrogation signature cipher is a predefined number of upper bits of the pre-calculated cipher.

In an embodiment, the response signature cipher based is a predefined number of lower bits of the pre-calculated cipher.

In an embodiment, the authentication request message includes a random number used to compute the pre-calculated cipher.

In an embodiment, the trigger event includes a push of an engine start button on an automobile or a touch of a door handle on the automobile.

In an embodiment, the method further comprises, after the authentication response message has been successfully validated, instructing an external device to perform a task associated with the trigger event.

In an embodiment, a wireless authentication system comprises a transponder to transmit and receive information and a base station to transmit and receive information. The base station is configured to, in a determined secure environment, execute cryptographic calculations of an encryption algorithm to produce a pre-calculated cipher for a subsequent authentication process, store the pre-calculated cipher in a nonvolatile storage device at the base station, in response to a trigger event, transmit an authentication request message of an authentication process, the authentication request message including an interrogation signature cipher based on the pre-calculated cipher, receive an authentication response message from a responding device, the authentication response message including a response signature cipher, validating the authentication response message at the base station to determine if the authentication process has been successful, and after the authentication response message has been successfully validated, executing additional cryptographic calculations at the base station to produce a next pre-calculated cipher for a next authentication process.

In an embodiment, the base station is further configured to transmit an initial authentication request message of an initial authentication process, the initial authentication request message including an initial interrogation signature cipher, receive an initial authentication response message and validate the initial authentication response message to determine if the initial authentication process has been successful, which indicates that the base station is in a secure environment.

In an embodiment, the encryption algorithm is an algorithm based on Data Encryption Standard (DES), triple DES, Advanced Encryption Standard (AES), Rivest, Shamir, and Adleman (RSA), or elliptic curve cryptography (ECC).

In an embodiment, the nonvolatile storage device is an Electrically Erasable Programmable Read-Only Memory (EEPROM).

In an embodiment, the interrogation signature cipher is a predefined number of upper bits of the pre-calculated cipher.

In an embodiment, the response signature cipher based is a predefined number of lower bits of the pre-calculated cipher.

In an embodiment, the authentication request message includes a random number used to compute the pre-calculated cipher.

In an embodiment, the trigger event includes a push of an engine start button on an automobile or a touch of a door handle on the automobile.

In an embodiment, the base station is further configured to instruct an external device to perform a task associated with the trigger event after the authentication response message has been successfully validated.

In an embodiment, a method for authentication using ciphers comprises, in a determined secure environment, executing cryptographic calculations of an encryption algorithm using a random number at a base station to produce a pre-calculated cipher for a subsequent authentication process, storing the pre-calculated cipher in a nonvolatile storage device at the base station, in response to a trigger event, transmitting an authentication request message of an authentication process from the base station, the authentication request message including an interrogation signature cipher that is a portion of the pre-calculated cipher, receiving an authentication response message from a responding device at the base station, the authentication response message including a response signature cipher, validating the authentication response message at the base station to determine if the authentication process has been successful, and after the authentication response message has been successfully validated, executing additional cryptographic calculations at the base station to produce a next pre-calculated cipher for a next authentication process.

In an embodiment, the method further comprises transmitting an initial authentication request message of an initial authentication process from the base station, the initial authentication request message including an initial interrogation signature cipher, receiving an initial authentication response message from the responding device or another responding device at the base station, and validating the initial authentication response message at the base station to determine if the initial authentication process has been successful, which indicates that the base station is in a secure environment.

Other aspects and advantages of embodiments of the present invention will become apparent from the following detailed description, taken in conjunction with the accompanying drawings, depicted by way of example of the principles of the invention.

BRIEF DESCRIPTION OF THE DRAWINGS

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment. Rather, language referring to the features and advantages is understood to mean that a specific feature, advantage, or characteristic described in connection with an embodiment is included in at least one embodiment. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment. Thus, the phrases "in one embodiment," "in an embodiment," and similar language throughout this specification may, but do not necessarily, all refer to the same embodiment.

Figure 1:
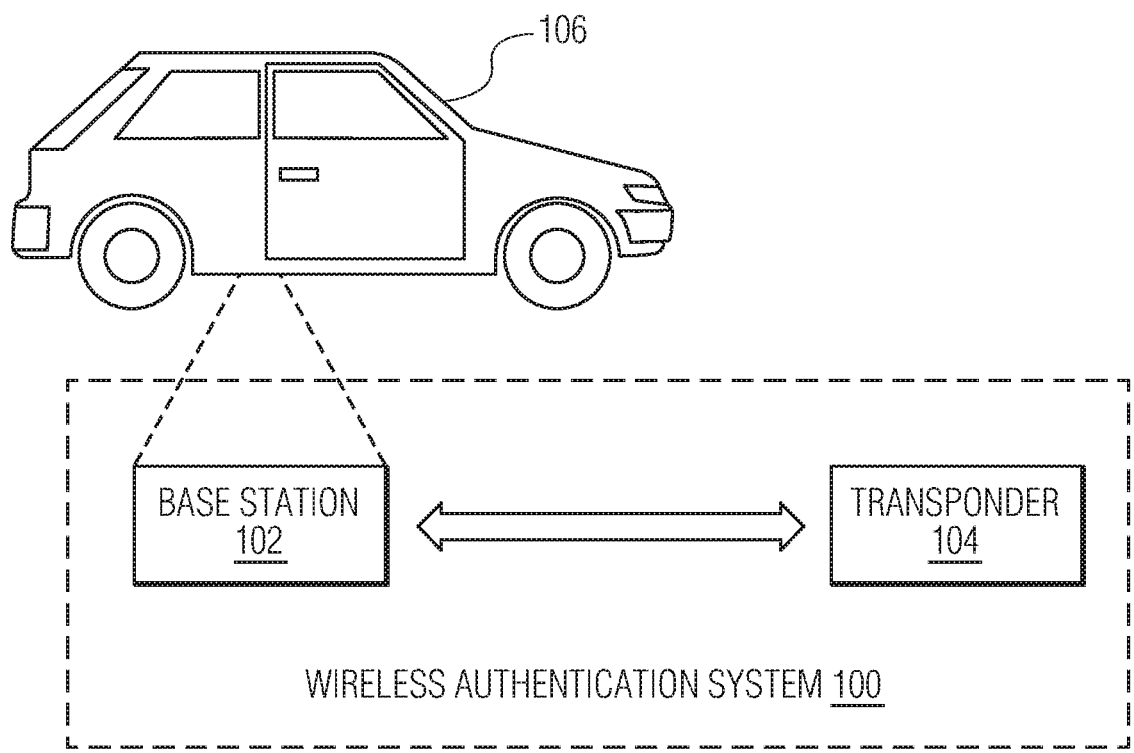
FIG. 1 is a diagram of a wireless authentication system in accordance with an embodiment of the invention, which is shown to be used in an automobile application.

FIG. 1 is a schematic block diagram of a wireless authentication system 100 in accordance with an embodiment of the invention. The wireless authentication system 100 includes a base station 102 and a transponder 104, which can communicate with each other wirelessly using one or more known wireless communication technologies. The wireless authentication system 100 may be used in various applications. As illustrated in FIG. 1, one application for the wireless authentication system is an automotive application in which the wireless authentication system 100 is part of a keyless entry/ignition system of an automobile 106. In this application, the base station 102 is located in the automobile 106, and the transponder 104 can be carried by a user of the automobile. The wireless authentication system 100 ensures that only a user with a valid transponder, i.e., the transponder 104 or a proper duplicate transponder, can lock/unlock and/or start the automobile 106. As described in detail below, the wireless authentication system 100 implements a technique that provides protection from side-channel attacks, such as differential power analysis/attacks (DPA).

Figure 2:
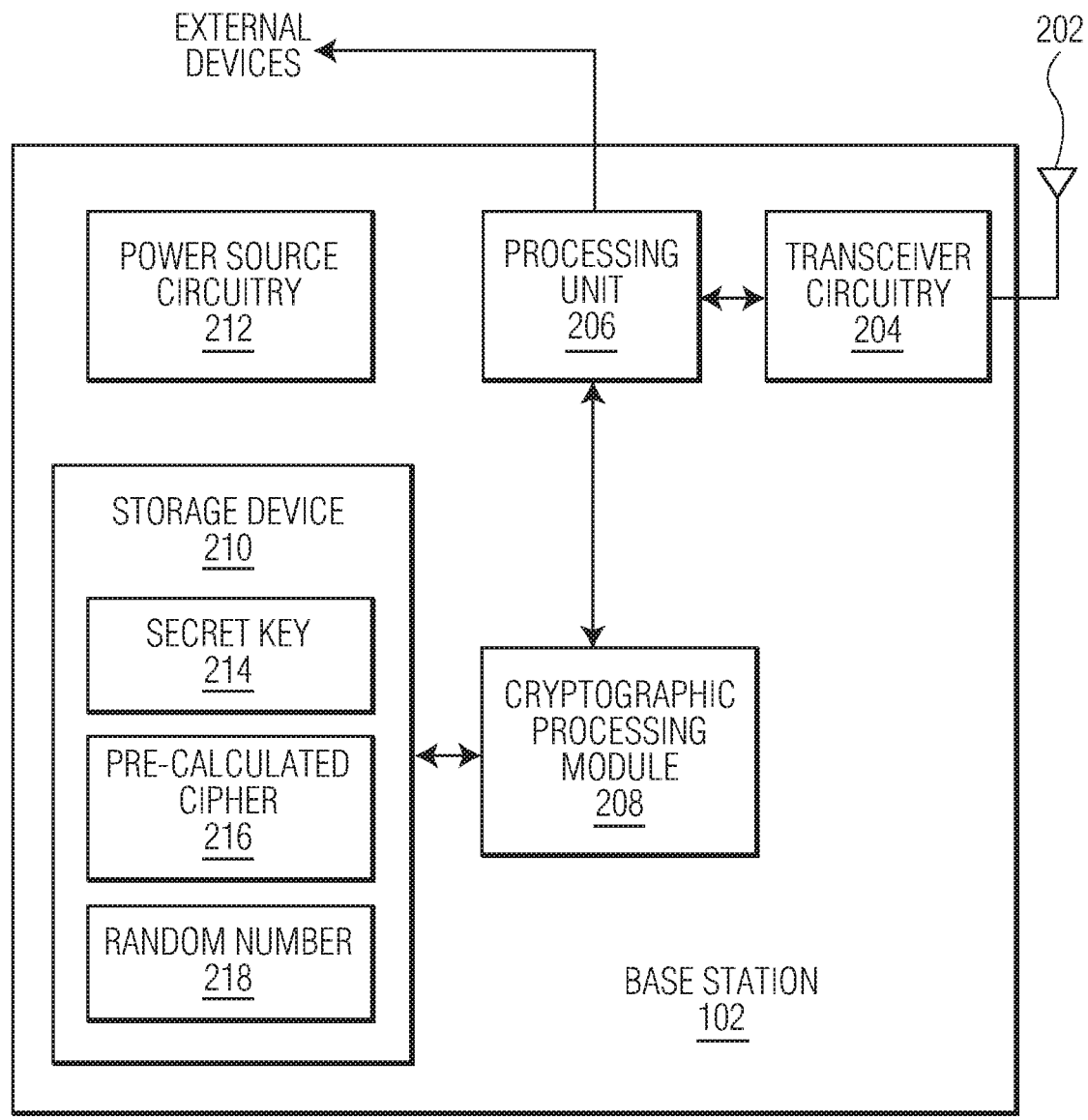
FIG. 2 is a block diagram of a base station of the wireless authentication system in accordance with an embodiment of the invention.

Turning now to FIG. 2, components of the base station 102 of the wireless authentication system 100 in accordance with an embodiment of the invention are illustrated. As shown in FIG. 2, the base station 102 includes an antenna 202, a transceiver circuitry 204, a processing unit 206, a cryptographic processing module 208, a storage device 210 and a power source circuitry 212. Although these components of the base station 102 are shown as being separate components, some of these components may be integrated together in some embodiment. As an example, the processing unit 206, the cryptographic processing module 208 and the storage device 210 may be integrated on a single integrated circuit (IC) chip.

The transceiver circuitry 204 is configured to wirelessly receive and transmit signals through the antenna 202 to communicate with the transponder 104. The transceiver circuitry 204 may employ any appropriate wireless technology to receive and transmit signals, such as radio-frequency (RF) communication technology or near-field communication (NFC) technology. In some embodiments, the transceiver circuitry 204 may include separate transmitter and receiver.

The processing unit 206 operates to execute various operations for authentication using ciphers. As described in detail below, the processing unit 206 is programmed to initiate an authentication process when a trigger event occurs. A trigger event can be a push of an engine start button on the automobile 106 or a touch of a driver's side door handle. An authentication process involves transmitting an authentication request message from the base station 102, receiving and validating an authentication response message and transmitting a control signal to one or more external devices (not shown) to take an appropriate action in response to the results of the validation, such as unlocking the drive side door or starting the engine of the automobile 106. As described in detail below, the processing unit 206 may initiate the execution of cryptographic calculations of an encryption algorithm when the base station is in a secure environment (when a valid transponder having a correct secret key is present). The processing unit 206 can be any type of a processing unit, such as a microprocessor or a microcontroller.

The cryptographic processing module 208 is configured to execute cryptographic calculations of an encryption algorithm on an input value using a secret key 214, which is stored on the storage device 210, to produce an output cipher 216. The cryptographic calculations may be calculations for any encryption algorithm, such as Data Encryption Standard (DES), triple DES, Advanced Encryption Standard (AES), Rivest, Shamir, and Adleman (RSA) and elliptic curve cryptography (ECC). In an embodiment, the input value is a random number 218 generated by the cryptographic processing module 208 or by an external processing component in the base station 102. The random number 218 may be a numerical value having any number of bits, e.g., 32 bits, the secret key may be an 128-bit long AES128 key, and the output cipher may be a vector of a predefined number of bits, e.g., 64 bits. In a secure environment, the output cipher resulting from the cryptographic calculations may be stored as a pre-calculated cipher in the storage device 210 with the random number 218 used to compute the pre-calculated cipher, which are then used for a subsequent authentication process, as explained below.

In an embodiment, the cryptographic processing module 208 may be implemented in hardware as processing circuits.

In other embodiments, the cryptographic processing module 208 may be implemented as software running on the processing unit 206.

The storage device 210 is used to store data for the base station 102. As mentioned above, the storage device 210 is used to store the secret key 214. In addition, the storage device 210 is used to store the pre-calculated cipher 216 and the random number 218 used to produce the cipher, as explained below. The storage device 210 can be any non-volatile storage device, such as an Electrically Erasable Programmable Read-Only Memory (EEPROM).

The power source circuitry 212 provides power to the various components of the base station 102, such as the transceiver circuitry 204, the processing unit 206 and the cryptographic processing module 208. In FIG. 1, the electrical connections between the power source circuitry 212 and the various components are not shown. The power source circuitry 212 may be connected to a battery of the automobile 106 to receive electrical power. The power source circuitry 212 may also include an internal backup battery to provide power when the battery of the automobile is dead or when the connection to the battery of the automobile has been disconnected.

Figure 3:
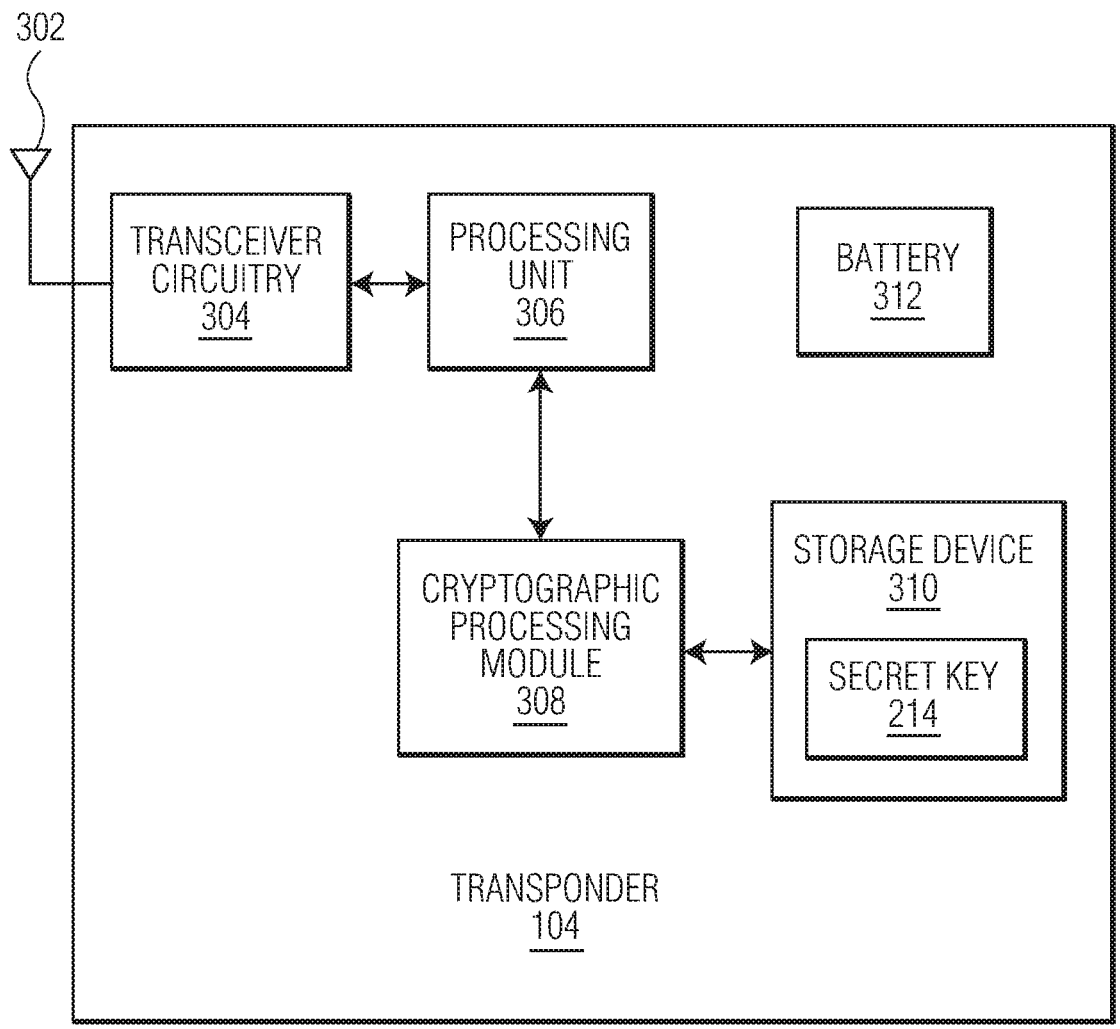
FIG. 3 is a block diagram of a transponder of the wireless authentication system in accordance with an embodiment of the invention.

Turning now to FIG. 3, components of the transponder 104 of the wireless authentication system 100 in accordance with an embodiment of the invention are illustrated. As shown in FIG. 3, the transponder 104 includes an antenna 302, a transceiver circuitry 304, a processing unit 306, a cryptographic processing module 308, a storage device 310 and a battery 312.

The transceiver circuitry 304 is configured to wirelessly receive and transmit signals through the antenna 302 to communicate with the base station 102. The transceiver circuitry 304 may employ any appropriate wireless technology to receive and transmit signals, such as RF communication technology or NFC technology. In some embodiments, the transceiver circuitry 304 may include separate transmitter and receiver.

The processing unit 306 operates to execute various operations for authentication using ciphers. The processing unit 306 is programmed to, in response to an authentication request message from the base station 102, generate and transmit an appropriate authentication response message back to the base station. The processing unit 306 can be any type of a processor, such as a microprocessor or a microcontroller.

The cryptographic processing module 306 of the transponder 104 is similar to the cryptographic processing module 206 of the base station 102. The cryptographic processing module 306 is configured to execute the same cryptographic calculations on an input value using the secret key 214, which is stored on the storage device 310 of the transponder 104, to produce an output cipher. The secret key 214 stored in the storage device 310 of the transponder 104 is the same secret key 214 stored in the storage device 210 of the base station 102. The cryptographic calculations may be calculations for the encryption algorithm used by the cryptographic processing module 206 of the base station 102. In an embodiment, the input value used by the cryptographic processing module 306 is the random number included in the authentication request message transmitted by the base station 102. The output of the cryptographic calculations computed by the cryptographic processing module 308 is used by the processing unit 306 of the transponder 104 to generate authentication response messages, as explained below.

The storage device 310 is used to store data for the transponder 104. In particular, the storage device 310 is used to store the secret key 214. The storage device 310 can be any nonvolatile storage device, such as an EEPROM.

The battery 312 provides power to the various components of the transponder 104, such as the transceiver circuitry, the processing unit 306 and the cryptographic processing module 308. The battery 312 can be any type of battery suitable for a small portable device.

In alternative embodiments, the transponder 104 may utilize power generated from field provided by the base station 102. In these embodiments, the transponder 104 may include a coil to receive the field from the base station. The power generated from the coil may be the main power source for the transponder or at least the power source for some of the components of the transponder. As an example, inductive coupling (e.g., 125 kHz magnetic low frequency (LF) field) may be used to transfer power from the base station to the transponder. In some implementations, the battery 312 may still be used battery only supplied communication modes, such as passive keyless entry applications or ultra-high frequency (UHF) applications.

Figure 4:
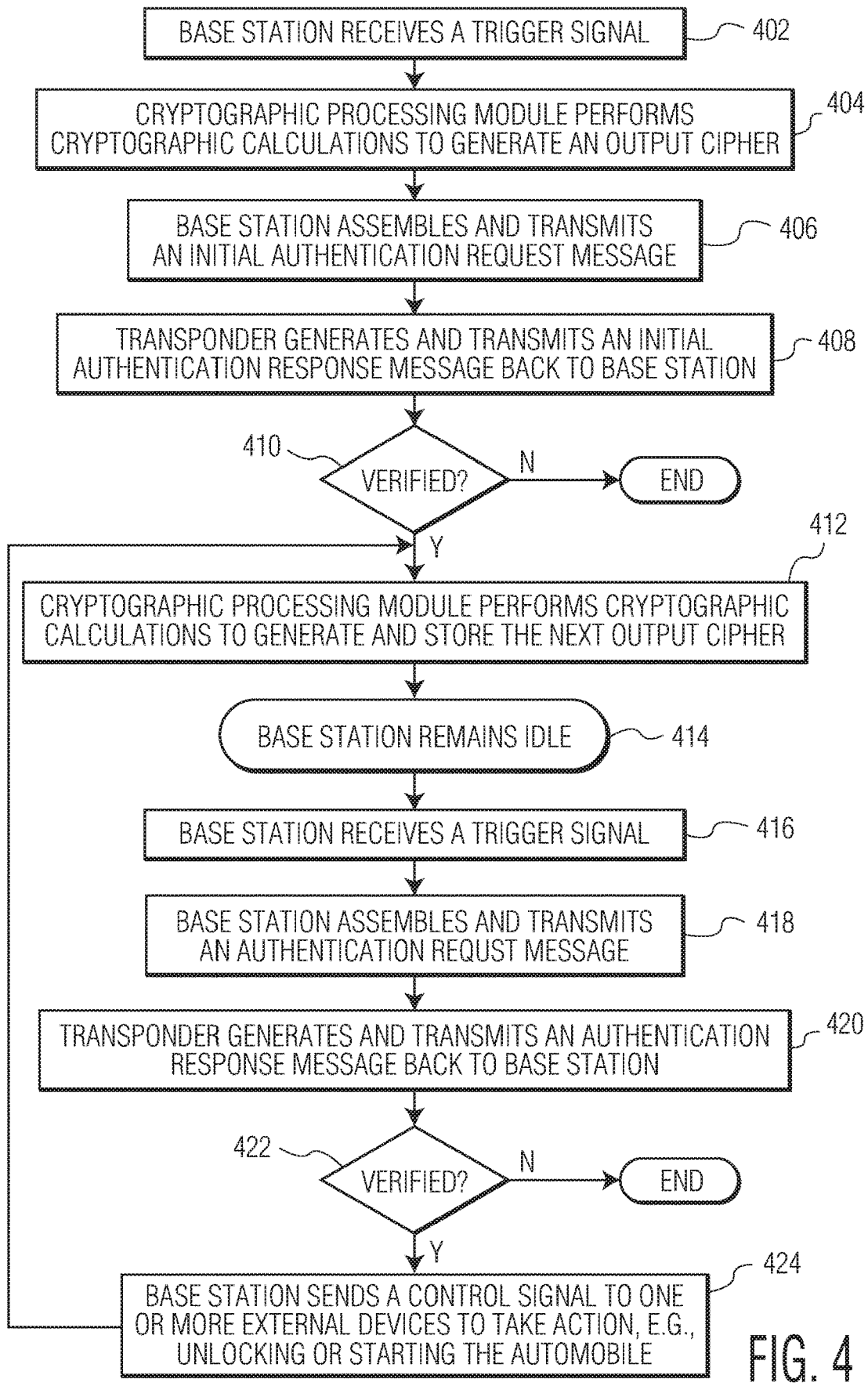
FIG. 4 is a flow diagram of an authentication operation performed by the wireless authentication system in accordance with an embodiment of the invention.
Figure 5:
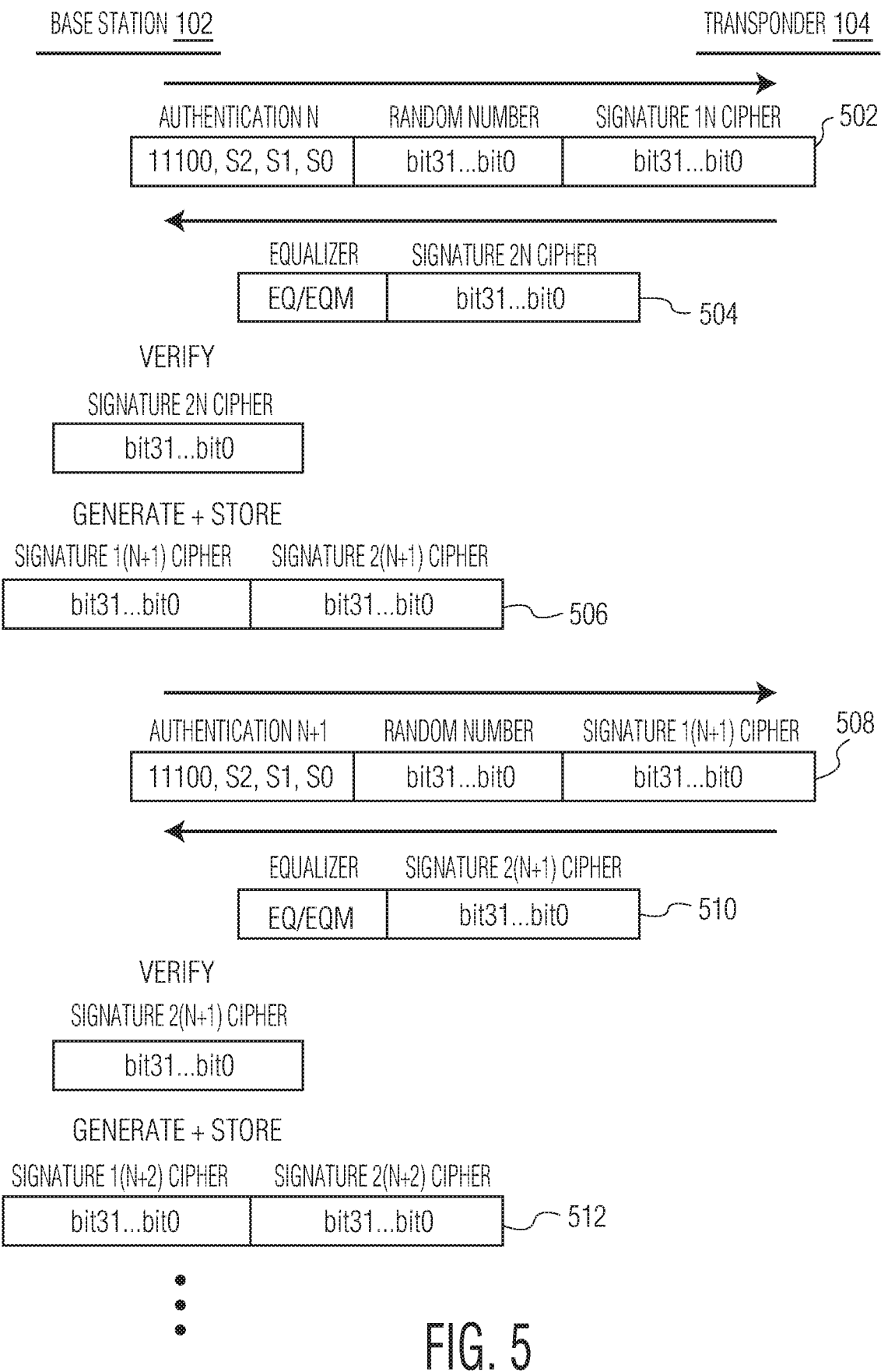
FIG. 5 is a data processing diagram related to the authentication operation depicted in FIG. 4.

An authentication operation of the wireless authentication system 100 in accordance with an embodiment of the invention is now described with reference to a flow diagram of FIG. 4 and a data processing diagram of FIG. 5. The authentication operation includes an initial or setup authentication process to compute and store pre-calculated cryptographic ciphers in a determined trusted environment and subsequent authentication processes for unlocking, locking and starting the automobile.

The initial authentication process begins at block 402, where the base station 102 receives a trigger signal in response to a trigger event, which is a signal indicating the start of the initial authentication process. The initial authentication process would typically be initiated at a car manufacturing facility or a valid car servicing facility. The trigger signal may be a signal indicating that the start button on the automobile 106 has been pressed or a door handle of the automobile has been touched.

Next, at block 404, the cryptographic processing module 208 of the base station 102 performs cryptographic calculations to generate an output cipher using the secret key 214 and a random number. Performing cryptographic calculations includes loading the secret key 214 from the storage device 210 and generating the random number using, for example, a random number generator running on the cryptographic processing module 208.

Next, at block 406, the processing unit 206 of the base station 102 assembles and transits an initial authentication request message, which is expected to be responded to by the transponder 104. This initial authentication request message includes at least a first interrogation cipher signature, which may be a portion of the output cipher generated using a random number and the secret key 214 stored in the storage device 210. As an example, the first interrogation cipher signature may be a predefined number of upper bits of the output cipher. This step is illustrated in FIG. 5 by an initial authentication request message 502 being transmitted from the base station 102 to the transponder 104. In a particular implementation, as illustrated in FIG. 5, the initial authentication request message 502 includes an authentication N signal, a random number and an interrogation signature 1N cipher. The authentication N signal may include the identification number of the base station 102. The random number is a 32-bit random number used to generate a 64-bit output cipher using the secret key 214 stored in the storage device 210 of the base station 102. The interrogation signature 1N cipher is the upper or first 32-bits of the output cipher. However, in other implementations, the number of bits used for the signatures, random numbers and/or secret keys may vary.

Next, at block 408, in response to the initial authentication request message, a responding device, which may be the transponder 104, generates and transmits an initial authentication response message back to the base station 102. The correct initial authentication response message would include at least a first response cipher signature, which is the expected proper response to the first interrogation cipher signature. The first response cipher signature is a portion of an output cipher generated using the random number received from the base station 102 and the secret key 214 stored in the storage device 310 of the transponder 104. As an example, the first response cipher signature may be a predefined number of lower bits of the output cipher. This step is illustrated in FIG. 5 by an initial authentication response message 504 being transmitted from the transponder 104 back to the base station 102. In a particular implementation, as illustrated in FIG. 5, the initial authentication response message includes an equalizer signal and a response signature 2N cipher. The equalizer signal may be, for example, 5-bits Manchester coded logical 1 bits, and is used for framing for the base station and settling of the base station receiver stage. The response signature 2N cipher is the lower or last 32-bits of an output cipher computed by the cryptographic processing module 308 of the transponder 104 using the random number 218 included in the initial authentication request message and the secret key 214 stored in the storage device 310 of the transponder 104. The output cipher generated by the transponder 104 should be identical to the output cipher generated by the base station 102.

Next, at block 410, the processing unit 206 of the base station 102 verifies whether the first response cipher signature in the initial authentication response message is the expected proper cipher signature for the first interrogation cipher signature that was transmitted in the initial authentication request message. This step is illustrated in FIG. 5 by the response signature 2N cipher being verified by the base station 102, i.e., the processing unit 206.

If the first response cipher signature in the initial authentication response message is not verified as the expected proper cipher for the first interrogation signal cipher, the process comes to an end, and thus, no further action is taken by the base station 102.

However, if the first response cipher signature in the initial authentication response message is verified as the expected proper cipher for the first interrogation cipher signature, the processing unit 206 determines that the current environment is a trusted environment, such as a car manufacturing facility or a valid car servicing facility.

In this determined trusted environment, the cryptographic processing module 208 of the base station 102 performs cryptographic calculations to generate the next output cipher using a new random number and the secret key, which is loaded again for the cryptographic calculations, and stores the next output cipher with the new random number in the storage device 210, at block 412. The next output cipher includes the next interrogation cipher signature and the next response cipher signature to be used during the next authentication process. This step is illustrated in FIG. 5 by a next output cipher 506, which includes an interrogation signature 1(N+1) cipher and a response signature 2(N+1) cipher, being generated and stored.

The base station is now operational and ready for a regular authentication process, which would be performed in an unknown environment. Thus, at block 414, the base station 102 remains idle, waiting for a regular authentication process to begin.

A regular authentication process in an unknown environment begins at block 416, where the base station 102 receives a trigger signal in response to a trigger event, which is a signal indicating the start of the regular authentication process. The regular authentication process is a normal process that would occur out in the field or in a real world environment. The trigger signal may be a signal indicating that the start button on the automobile has been pressed or a driver's side door handle of the automobile has been touched.

Next, at block 418, the processing unit 206 of the base station 102 assembles an authentication request message using the pre-calculated next interrogation signature cipher and the corresponding random number stored in the storage device 210 of the base station 102. Thus, the secret key 214 is not loaded or accessed and no cryptographic calculations are performed at this time, which prevents possible side channel attacks. In a particular implementation, as illustrated in FIG. 5, an authentication request message 508 includes an authentication N+1 signal, the pre-calculated interrogation signature 1(N+1) cipher, and the random number that was used to compute the signature 1(N+1) cipher. The authentication N+1 signal may be same as the authentication N signal, and thus, may be a digital identification of the base station 102.

Next, at block 420, in response to the authentication request message, a responding device, which may be the transponder 104, generates and transmits an authentication response message back to the base station 102. The correct authentication response message would include at least the next response cipher signature generated using the random number received from the base station 102 and the secret key 214 stored in the storage device 310 of the transponder 104. In a particular implementation, as illustrated in FIG. 5, an authentication response message 510 includes an equalizer signal and a response signature 2(N+1) cipher. The equalizer signal may be same as the equalizer signal in the initial authentication response message. The response signature 2(N+1) cipher is the expected proper response to the interrogation signature 1(N+1) cipher. The response signature N+1 cipher is generated using the random number included in the authentication request message using the secret key 214 stored in the storage device 310 of the transponder 104.

Next, at block 422, the processing unit 206 of the base station 102 verifies whether the response cipher signature in the authentication response message is the expected proper cipher signature for the pre-calculated next interrogation signature cipher that was transmitted in the authentication request message. This step is illustrated in FIG. 5 by the response signature 2(N+1) cipher being verified by the base station 102, i.e., the processing unit 206.

If the response cipher signature in the authentication response message is not verified as the expected proper cipher for the pre-calculated next interrogation signal cipher, the process comes to an end, and thus, no further action is taken by the base station 102. In some embodiments, the base station 102 may provide a warning that the authentication process was unsuccessful, which would indicate that there may be an error or the responding device is not the correct transponder.

However, if the response cipher signature in the authentication response message is verified as the expected proper cipher for the pre-calculated next interrogation cipher signature, the processing unit 206 of the base station 102 transmits a control signal to one or more external devices in the automobile 106 to take an appropriate action, which may be unlocking, locking or starting the automobile, at block 424.

Since the response cipher signature has been verified, it is assumed that there is no threat of attack at this time. Thus, the next output cipher can now be safely generated using a new random number and the secret key 214. As such, the operation proceeds back to block 412 to generate the next output cipher to be used for the next regular authentication process. This step is illustrated in FIG. 5 by a next output cipher 512, which includes an interrogation signature 1(N+2) cipher and a response signature 2(N+2) cipher, being generated and stored.

Using the described technique, the output cipher is never generated during a regular authentication process without first being authenticated using a pre-calculated cipher. Thus, a secure environment is first determined before loading the secret key 214 or computing any cryptographic calculations. Thus, with the described technique, the threat of side channel attacks, such as DPA, is virtually eliminated.

Figure 6:
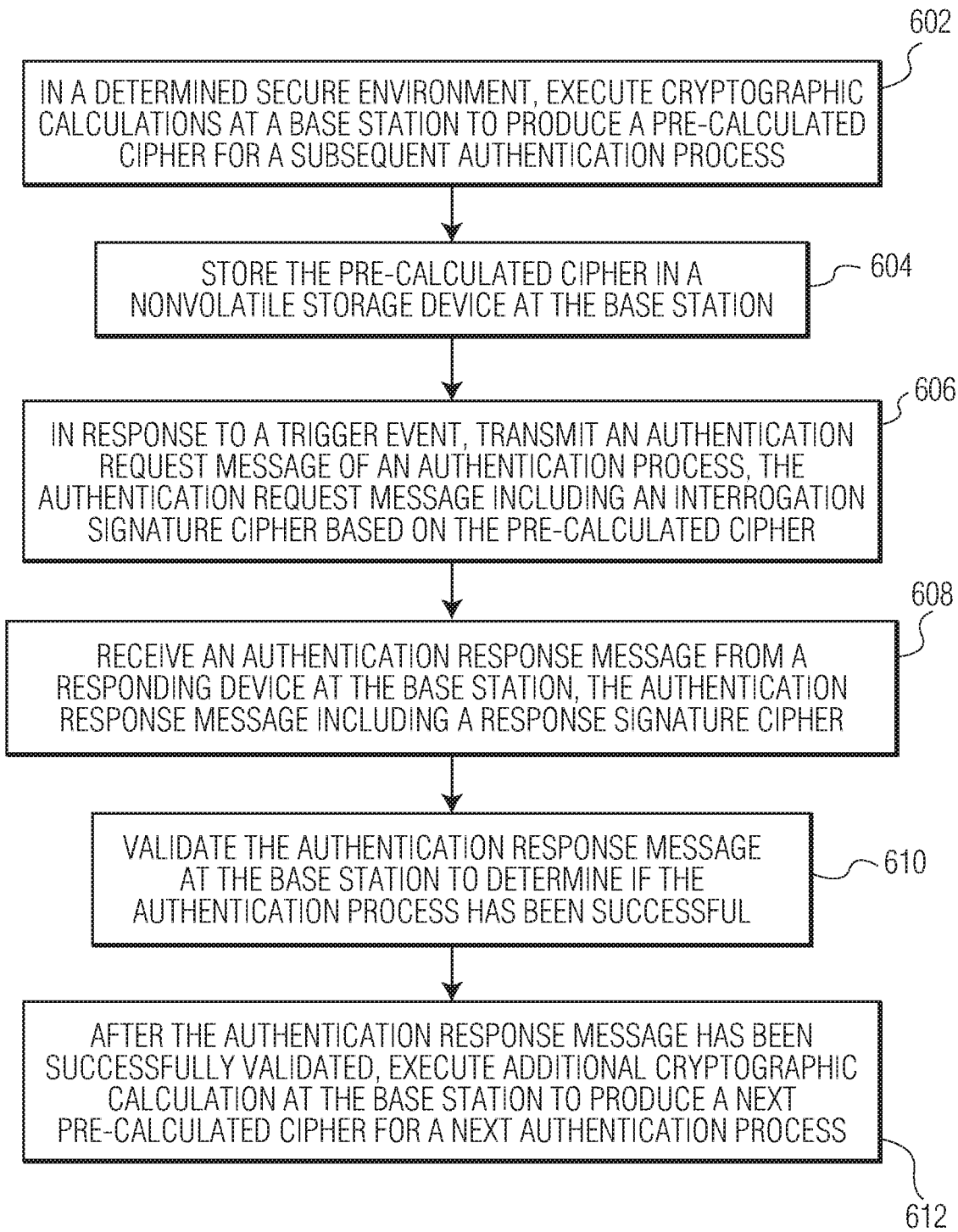
FIG. 6 is a process flow diagram that illustrates a method for authentication using ciphers in accordance with an embodiment of the invention.

FIG. 6 is a process flow diagram that illustrates a method for authentication using ciphers in accordance with an embodiment of the invention. At block 602, in a determined secure environment, cryptographic calculations of an encryption algorithm are executed at a base station to produce a pre-calculated cipher for a subsequent authentication process. At block 604, the pre-calculated cipher is stored in a nonvolatile storage device at the base station. At block 606, in response to a trigger event, an authentication request message of an authentication process is transmitted from the base station. The authentication request message includes an interrogation signature cipher based on the pre-calculated cipher. At block 608, an authentication response message is received from a responding device at the base station. The authentication response message includes a response signature cipher. At block 610, the authentication response message is validated at the base station to determine if the authentication process has been successful. At block 612, after the authentication response message has been successfully validated, additional cryptographic calculations are executed at the base station to produce a next pre-calculated cipher for a next authentication process.

Although the operations of the method herein are shown and described in a particular order, the order of the operations of the method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

In addition, although specific embodiments of the invention that have been described or depicted include several components described or depicted herein, other embodiments of the invention may include fewer or more components to implement less or more features.

Furthermore, although specific embodiments of the invention have been described and depicted, the invention is not to be limited to the specific forms or arrangements of parts so described and depicted. The scope of the invention is to be defined by the claims appended hereto and their equivalents.

What is claimed is:

1. A method for authentication using ciphers, the method comprising:
in a determined secure environment, executing cryptographic calculations of an encryption algorithm at a base station to produce a pre-calculated cipher comprising an interrogation signature cipher and a response signature cipher for a subsequent authentication process;
storing the pre-calculated cipher in a nonvolatile storage device at the base station;
in response to a trigger event, transmitting an authentication request message of an authentication process from the base station, the authentication request message including the interrogation signature cipher;
receiving an authentication response message from a responding device at the base station, the authentication response message including a response signature cipher;
validating the authentication response message at the base station by verifying whether the received response signature cipher is the expected pre-calculated response signature cipher to determine if the authentication process has been successful; and
after the authentication response message has been successfully validated, executing additional cryptographic calculations at the base station to produce a next pre-calculated cipher comprising an interrogation signature cipher and a response signature cipher for a next authentication process.

2. The method of claim 1, further comprising:
transmitting an initial authentication request message of an initial authentication process from the base station, the initial authentication request message including an initial interrogation signature cipher;
receiving an initial authentication response message from the responding device or another responding device at the base station; and
validating the initial authentication response message at the base station to determine if the initial authentication process has been successful, which indicates that the base station is in a secure environment.

3. The method of claim 1, wherein the encryption algorithm is an algorithm based on Data Encryption Standard (DES), triple DES, Advanced Encryption Standard (AES), Rivest, Shamir, and Adleman (RSA), or elliptic curve cryptography (ECC).

4. The method of claim 1, wherein the nonvolatile storage device is an Electrically Erasable Programmable Read-Only Memory (EEPROM).

5. The method of claim 1, wherein the interrogation signature cipher is a predefined number of upper bits of the pre-calculated cipher.

6. The method of claim 1, wherein the response signature cipher based is a predefined number of lower bits of the pre-calculated cipher.

7. The method of claim 1, wherein the authentication request message includes a random number used to compute the pre-calculated cipher.

8. The method of claim 1, wherein the trigger event includes a push of an engine start button on an automobile or a touch of a door handle on the automobile.

9. The method of claim 1, further comprising after the authentication response message has been successfully validated, instructing an external device to perform a task associated with the trigger event.

10. A wireless authentication system comprising:
a transponder to transmit and receive information; and
a base station to transmit and receive information, the base station being configured to:
in a determined secure environment, execute cryptographic calculations of an encryption algorithm to produce a pre-calculated cipher comprising an interrogation signature cipher and a response signature cipher for a subsequent authentication process;
store the pre-calculated cipher in a nonvolatile storage device at the base station;
in response to a trigger event, transmit an authentication request message of an authentication process, the authentication request message including the interrogation signature cipher;
receive an authentication response message from a responding device, the authentication response message including a response signature cipher;
validating the authentication response message at the base station by verifying whether the received response signature cipher is the expected pre-calculated response signature cipher to determine if the authentication process has been successful; and
after the authentication response message has been successfully validated, executing additional cryptographic calculations at the base station to produce a next pre-calculated cipher comprising an interrogation signature cipher and a response signature cipher for a next authentication process.

11. The wireless authentication system of claim 10, wherein the base station is further configured to:
transmit an initial authentication request message of an initial authentication process, the initial authentication request message including an initial interrogation signature cipher;
receive an initial authentication response message; and
validate the initial authentication response message to determine if the initial authentication process has been successful, which indicates that the base station is in a secure environment.

12. The wireless authentication system of claim 10, wherein the encryption algorithm is an algorithm based on Data Encryption Standard (DES), triple DES, Advanced Encryption Standard (AES), Rivest, Shamir, and Adleman (RSA), or elliptic curve cryptography (ECC).

13. The wireless authentication system of claim 10, wherein the nonvolatile storage device is an Electrically Erasable Programmable Read-Only Memory (EEPROM).

14. The wireless authentication system of claim 10, wherein the interrogation signature cipher is a predefined number of upper bits of the pre-calculated cipher.

15. The wireless authentication system of claim 10, wherein the response signature cipher based is a predefined number of lower bits of the pre-calculated cipher.

16. The wireless authentication system of claim 10, wherein the authentication request message includes a random number used to compute the pre-calculated cipher.

17. The wireless authentication system of claim 10, wherein the trigger event includes a push of an engine start button on an automobile or a touch of a door handle on the automobile.

18. The wireless authentication system of claim 10, wherein the base station is further configured to instruct an external device to perform a task associated with the trigger event after the authentication response message has been successfully validated.

19. A method for authentication using ciphers, the method comprising:

in a determined secure environment, executing cryptographic calculations of an encryption algorithm using a random number at a base station to produce a pre-calculated cipher comprising an interrogation signature cipher and a response signature cipher for a subsequent authentication process;

storing the pre-calculated cipher in a nonvolatile storage device at the base station;

in response to a trigger event, transmitting an authentication request message of an authentication process from the base station, the authentication request message including the interrogation signature cipher;

receiving an authentication response message from a responding device at the base station, the authentication response message including a response signature cipher;

validating the authentication response message at the base station by verifying whether the received response signature cipher is the expected pre-calculated response signature cipher to determine if the authentication process has been successful; and after the authentication response message has been successfully validated, executing additional cryptographic calculations at the base station to produce a next pre-calculated cipher comprising an interrogation signature cipher and a response signature cipher for a next authentication process.

20. The method of claim 19, further comprising:

transmitting an initial authentication request message of an initial authentication process from the base station, the initial authentication request message including an initial interrogation signature cipher;

receiving an initial authentication response message from the responding device or another responding device at the base station; and validating the initial authentication response message at the base station to determine if the initial authentication process has been successful, which indicates that the base station is in a secure environment.

* * * * *